United States Patent Office 2,815,737
Patented Dec. 10, 1957

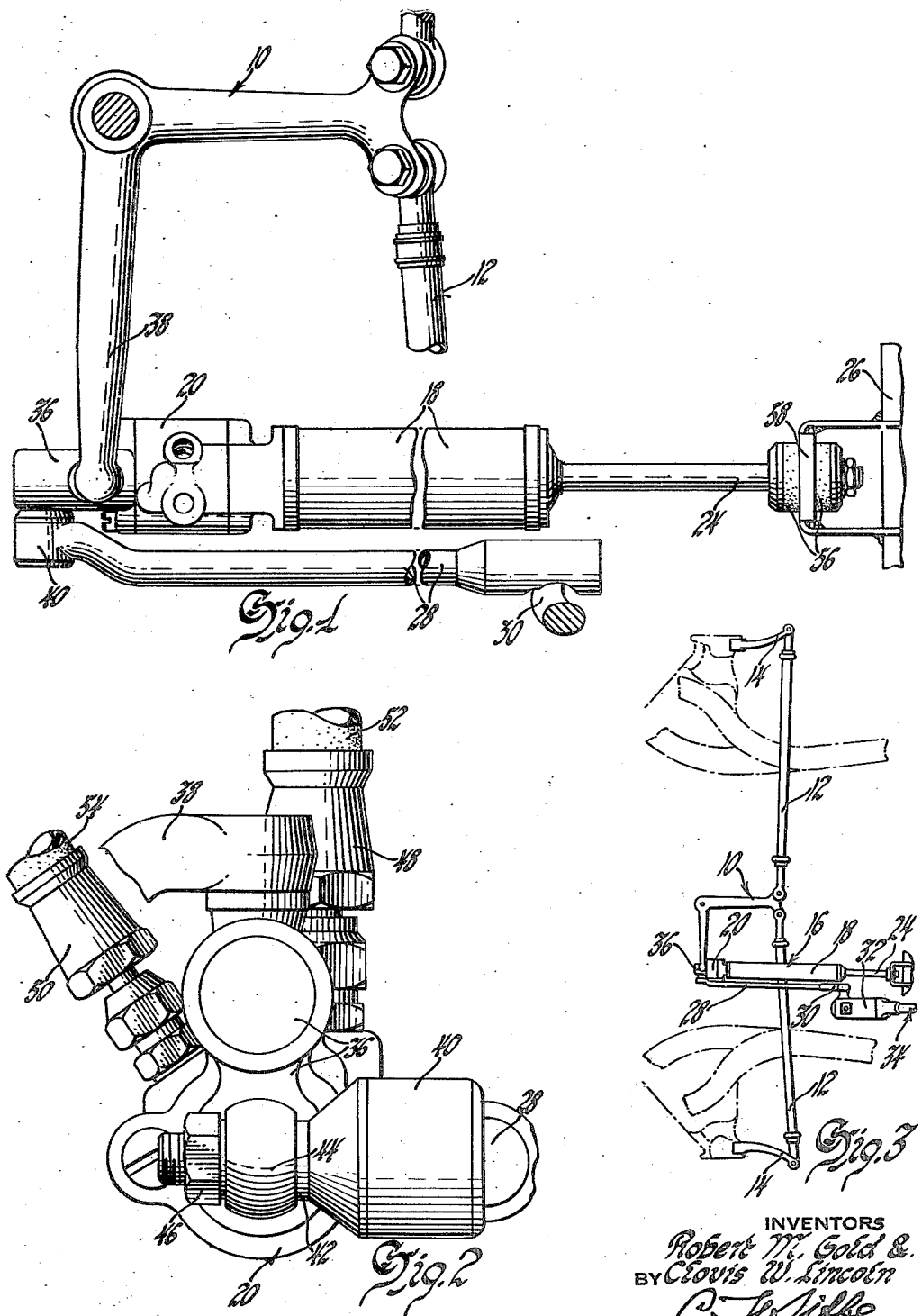

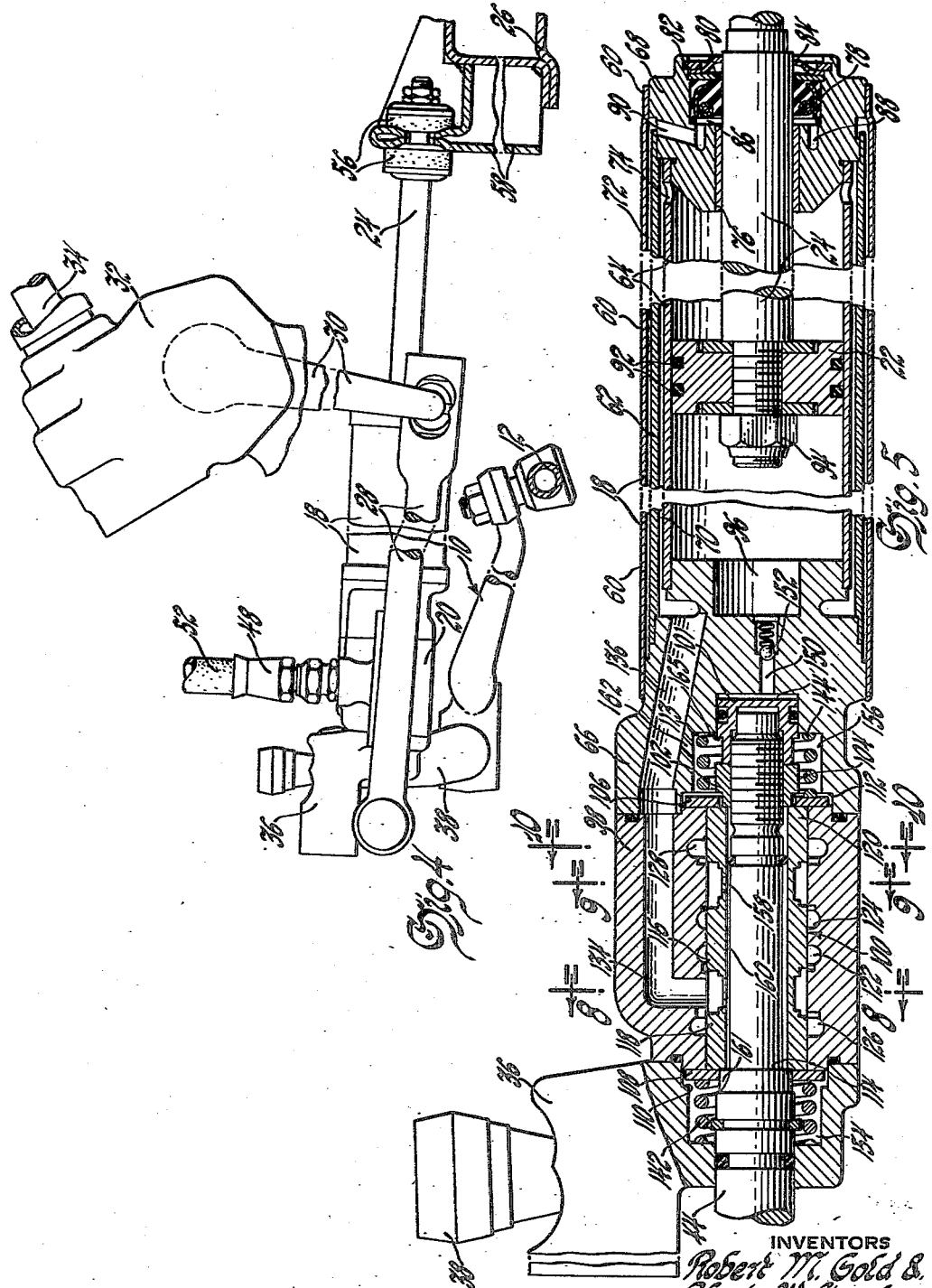

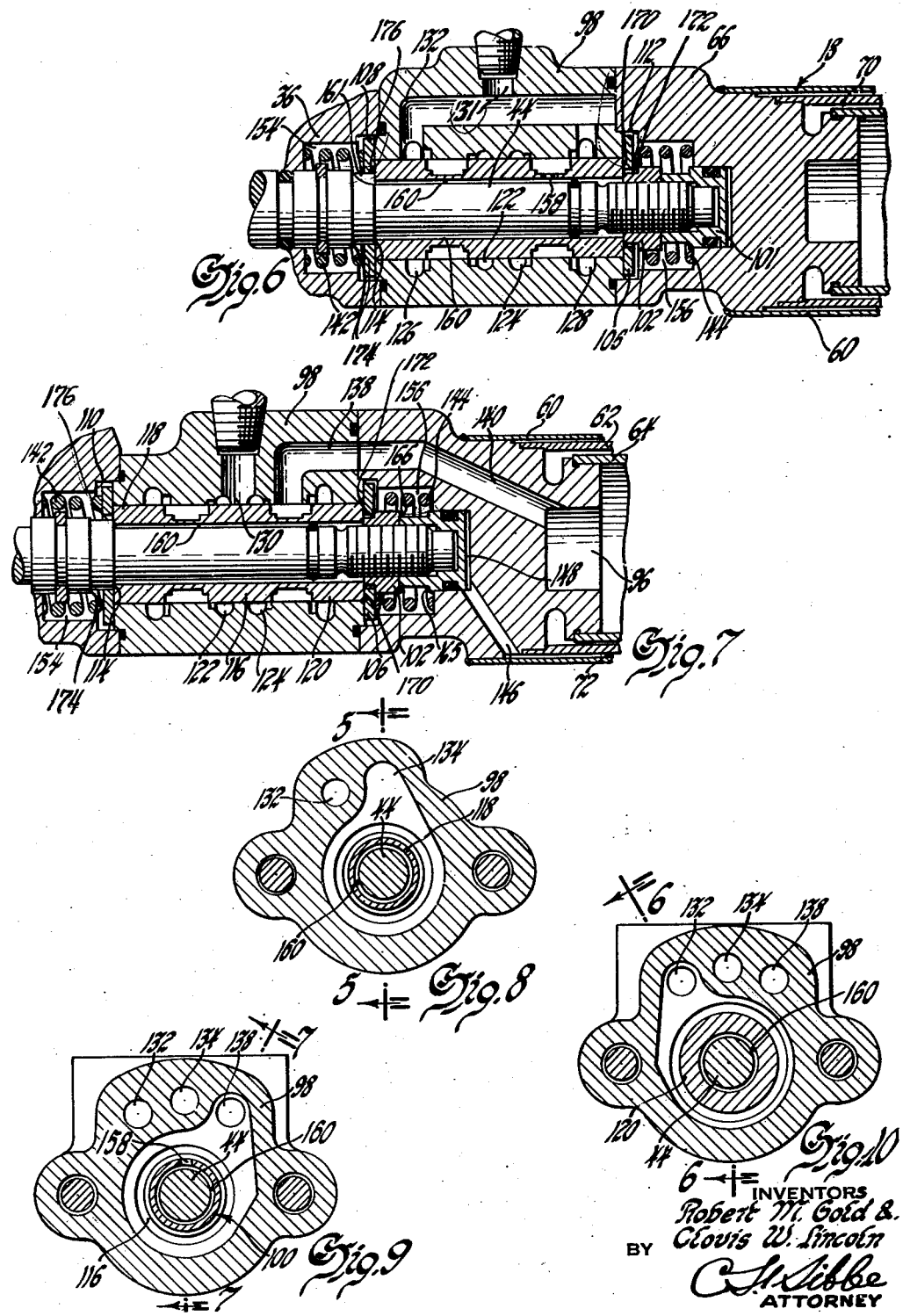

2,815,737

FLUID OPERATED MECHANISM WITH PROPORTIONAL FEEL

Robert M. Gold and Clovis W. Lincoln, Saginaw, Mich., assignors to General Motors Corporation, Detroit, Mich., a corporation of Delaware Application August 14, 1953, Serial No. 374,346

1 Claim. (Cl. 121—41)

This invention relates to the power steering of automotive vehicles and more particularly concerns a fluid operated power steering gear having improved centering characteristics.

The more successful of the fluid power steering systems presently in use employ oil as the fluid medium and comprise an "open center" valve through which the oil is normally continuously circulated by an engine driven pump. In addition to being subject to the pump pressure at all times, this valve is normally open to both faces of a double-acting piston confined within a power cylinder and having a shaft or stem integral therewith or secured thereto extending from one end of the cylinder. Either the shaft or the cylinder may be operatively connected to a selected steering member. Assuming a predetermined steering resistance, one of the valve parts is caused to slide or rotate (depending on the nature of the valve) in one direction or the other, as governed by the direction of rotation of the steering wheel, to substantially or completely confine the flow of oil to only one end of the cylinder while retarding or preventing exhaustion of any oil from such end. This brings about the desired powering of the steering member which continues until release of the effort at the steering wheel, when the valve parts become automatically centered, i. e. restored to their normal relative positions.

As in the case of any such servo mechanism, the automatic centering of the valve parts results from a follow-up action, one of the parts being so associated with a steered part that the movement of the latter tends to cause movement of the valve part to its normal relative position which is reached simultaneously with cessation of the effort at the steering wheel.

In order to obtain a steering "feel," which would otherwise be lacking, a spring system providing a resistance required to be overcome incident to any relative movement of the valve components is normally built into the valve. Such resistance may, with advantage, be supplemented by a hydraulic force operating in opposition to displacement of the valve parts and bearing a direct relation to the steering resistance. The over-all added resistance may amount, for example, to about three-four pounds effort at the steering wheel, in which case the steering on smooth roads at normal cruising speeds may be entirely manual, the power means coming into play only at lesser speeds and during parking operations, for instance. Apart from providing a steering feel, the spring system, especially if aided by hydraulic means as just indicated, serves to dampen out road shocks normally transmitted to the steering wheel and thus provides a safety factor.

In the case of the hydraulic mechanisms to which the present invention most specifically relates, the valve is of the spool-type including a central land serving on longitudinal movement of the spool to limit the oil flow to one side or the other of the piston in the power cylinder, as determined by the direction of such movement, and a pair of end lands equidistant from the central land, which are functional with respect to two return ports to the pump, or to a reservoir from which the pump is supplied. These end lands have previously been formed to a larger diameter than the central land for the purpose of hydraulic reaction (see above) aided by springs at either end of the valve spool. While such construction, described in detail in copending application Serial No. 273,067, filed February 23, 1952, now abandoned, has worked fairly well in practice, it has been observed that a comparatively greater manual effort is required at the steering wheel to turn the same in a direction leading to the pressurizing of the piston shaft end of the power cylinder than in the other direction.

Our invention has as its principal object to correct the undesirable condition indicated. In accordance therewith, instead of forming the end lands to a larger diameter than the central land as heretofore, we form all of the lands to the same diameter, thus greatly facilitating manufacture of the valve spool, and utilize the chambers in the valve housing which contain the previously-mentioned springs as pressure chambers for hydraulic reaction. In the new valve structure, suitable passageways or conduits are provided so that, with the valve spool in centered relation, the chambers are connected to the valve inlet port and to the opposite ends of the power cylinder. On movement of the spool, the chamber in the direction of the movement becomes pressurized to the same extent as the end of the cylinder required to be pressurized to effect power turning of the dirigible wheels of the vehicle in the desired direction. Thus, a force is set up in opposition to the spool movement, this force being in proportion to, but much less than, the force necessary to overcome the particular steering resistance obtaining, and tending, with the spring confined in the chamber, to restore the spool to its normal centered position. Depending on the particular valve construction, the hydraulic centering force may be exerted directly against the ends of the valve spool and/or against thrust washers, for example, adjacent the ends thereof. In any case, the surfaces available for hydraulic reaction in the chamber toward which the spool travels incident to the pressurizing of the piston shaft end of the cylinder are of lesser total area than the surfaces available for hydraulic reaction in the other chamber. In this way we compensate for the reduction in the effective area of the piston in the indicated portion of the cylinder, occasioned by the piston shaft, and the consequent relatively higher pressure needed to cause movement of the piston or cylinder, as the case may be, in the direction requiring pressurizing of such portion of the cylinder. It is this variance in pressure demand as between the two ends of the cylinder, it was discovered, which gave rise to the problem solved by our invention.

The present invention will be better understood from the following specific description which will proceed with reference to the accompanying drawings illustrating the same as applied to a hydraulic power steering gear including a combined valve and cylinder assembly and in which:

Figure 1 is a fragmentary plan view of the installation, certain parts being shown broken away;

Figure 2 is an enlarged end view of the unit;

Figure 3 is a diagrammatic representation of the particular steering system;

Figure 4 is a side view showing the gear as it appears in association with the conventional gear box and steering shaft, certain parts again being shown broken away;

Figure 5 is a longitudinal sectional view through the valve and cylinder assembly;

Figure 6 is a section on the line 6—6 of Figure 10;

Figure 7 is a section on the line 7—7 of Figure 9;

Figure 8 is a section on the line 8—8 of Figure 5;

Figure 9 is a section on the line 9—9 of Figure 5; and
Figure 10 is a section on the line 10—10 of Figure 5.

As will be immediately apparent to those skilled in the art, the illustrated mechanism is of the so-called "booster" type as opposed to the "integral" type as represented, for example, by the gear described in Davis Pat. 2,213,271, wherein the valve controlling the fluid flow is associated with and actuated by movement of the steering shaft and the power is applied to the pitman arm. It should be understood at the outset that limitation of the invention to booster mechanisms is not thereby intended, the improvements herein being equally applicable to integral power steering gears.

Referring first to Figure 3, in which the frame of the vehicle and the independent suspension mountings for the dirigible wheels are indicated in broken lines, it will be observed that the system comprises a bell crank 10 linked to a pair of tie rods 12, each connecting at its outermost end to a radius rod 14, these latter rods being operatively connected to the dirigible wheels. In place of the usual drag link there is substituted an assembly, generally denoted by the numeral 16, combining a power cylinder 18 and a valve 20, which controls the flow of the pressure fluid between the cylinder and the source of fluid pressure. Cylinder 18 confines a piston 22 (Figure 5) having fixed thereto or integral therewith a piston shaft 24 extending through the end of the cylinder opposite the valve 20 for attachment at 26 to the frame of the vehicle.

The valve 20, assuming a sufficient steering resistance, as later explained, is actuated via a rod 28, which would normally be the drag link component of the system. This rod 28 connects with the pitman arm 30 depending from the gear box 32 confining the usual gear sector and the mating worm at the end of the steering shaft 34.

At its lefthand end valve 20 has secured thereto an adapter 36 (Figures 1, 2 and 4) providing a socket for the reception of a ball stud depending from the end of the bell crank arm 38. Below and to the right of such adapter, as the same appears in Figure 2, is a part 40 providing a socket for the ball stud at the end of the rod 28 opposite the pitman 30. Part 40 includes a shank portion 42 passing through an aperture at the end of the stem 44, which represents a portion of the movable element of the valve 20. A nut 46 secures the part 40 to the stem 44, the end of the shank 42 being reduced in diameter and threaded to receive the nut.

Valve 20 is provided with a pair of hose fittings 48, 50 (Figures 2 and 4). The corresponding hose sections 52 and 54 may be considered as extending, respectively, to a pump powered as from the crank shaft of the engine of the vehicle and an oil reservoir from which the pump draws, hose 54 thus representing the inlet line to the valve, hose 52 the outlet or return line. Illustration of the pump and reservoir herein is not believed necessary, these parts being conventional and well understood in the art. As indicated, hydraulic operation of the subject booster is preferred, but the same may be adapted for air or vacuum operation, for example.

The shaft 24 of the piston 22 is shown anchored to the frame 26 of the vehicle through rubber blocks 56 one at either side of the central portion of the bracket mounting 58.

Cylinder 18 (Figure 5) will be observed as formed of three concentric tubular members 60, 62 and 64 each of which may be secured as by welding to the valve housing member 66 and a cap piece 68. The tubular members are suitably spaced apart so as to provide annular conduits 70 and 72, the purpose of which will later appear. Inner tubular member 64 is apertured at 74, thus opening the inner annular conduit 70 to the cylinder.

Cylinder cap piece 68 provides a bearing for the piston shaft 24, the cap proper being spaced from the shaft by a bushing 76. Beyond this bushing is a low-pressure seal 78 of an easily recognizable type held in place by an annular thrust washer 80 outside of which is a suitable wiping ring retained by backup washer 84 and locking piece 82. Mediate the low-pressure seal and the outer inner face of the cap piece 68 is an annular space 86 which with a circular groove 88 in the cap piece forms what may be referred to as a fluid collection chamber. A passageway 90 connects the groove 88 and the outer annular conduit 72.

Piston 22, as shown, carries a pair of sealing rings 92 and is connected to the piston shaft 24 by means of a bolt 94, adapted to nest in a recess 96 in the valve housing member 66 when the piston is in its leftmost position.

The valve 20, in addition to the housing member 66, comprises a central housing member 98 confining a spool element 100 including a central land 116 and a pair of end lands 118, 120 of the same diameter as the central land. This spool is centrally bored to receive the previously mentioned stem 44, that portion of the stem within the spool being of reduced diameter.

A nut element 102 having an annular rib 104 is threaded on the end of the stem 44 within the housing member 66, to hold the spool 100 tightly against an annular shoulder 114 provided incident to the reduction in the diameter of the stem. Loosening of the nut 102 is precluded by a locking nut 101 within which the stem 44 terminates. A thrust washer 106 and 108 surrounds the stem 44 at either end of the spool, these washers being contained by annular recesses formed in the housing member 66 and the adapter 36, respectively, the adapter serving as a part of the valve housing. It will be readily seen that longitudinal movement of the spool is limited by the shoulders 110 and 112 provided by the recessing, and that any movement of the stem necessarily induces like movement of the spool.

In addition to being bored to accommodate the spool 100, valve housing member 98 is radially bored and counter-bored to provide circular central passageways 122 and 124 and circular end passageways 126 and 128. Passageways 122 and 124 represent inlet passageways, the inlet port 130 (Figure 7) opening to both. Passageways 126 and 128 both communicate with a longitudinal passageway 132 (Figure 6) connecting via port 131 with the hose 52 through which exhaust fluid from the cylinder 18 is returned to the source of fluid pressure. A second longitudinal passageway 134 (Figures 5, 8–10) extends from a point intermediate the central land 116 and the end land 118 to a point of juncture with a passageway 136 in the valve housing member 66. The passageway 136 connects with the annular conduit 70, which, as previously noted, opens to the cylinder via the apertures 74.

A third longitudinal passageway 138 in the housing member 98 extends from a point intermediate the central land 116 (Figure 7) and the end land 120 to a point of juncture with a passageway 140 in the housing member 66. Passageway 140 terminates in the recess 96 forming part of the chamber of the cylinder.

Surrounding the stem 44 to the left of the valve spool 100 (Figure 5) is a spring 142. This spring is confined within a recess formed within the adapter 36 and bears against the thrust washer 108 and the annular wall representing the maximum depth of the recess. Similarly, to the right of the spool piece 100 there is confined within a recess formed in the valve housing member 66 and surrounding the nut 102 a second spring 144 which bears against the thrust washer 106 and the annular wall 113.

Springs 142 and 144, aided by fluid pressure as later explained, serve to normally maintain the valve spool in the neutral or centered condition, in which the spool is shown in all of the figures in which it appears. The maximum movement of the spool, as previously indicated, is determined by the spacing between the thrust washers 108, 106 and the shoulders 110 and 112, respectively. With the valve spool centered, fluid entering the valve via the inlet line 54 and the port 130 is divided laterally into two streams corresponding to the opposite sides or faces of the piston in the power cylinder 18.

The pump, not shown, representing the source of the fluid medium is in constant operation at all times, the fluid merely being cycled through the unitary valve and power cylinder when there is no power steering demand. It is to be noted that the fluid diverted to the left of the central land 116 has ingress to the right hand end of the cylinder (Figure 5) via passageways 134, 136, annular conduit 70 and aperture 74, while the fluid diverted to the right of the central land has ingress (Figure 7) to the left-hand end of the cylinder via passageways 138, 140 and recess 96. The recycle of the fluid to the pump, or to the reservoir supplying the pump, follows passageway 132 (Figure 6) which is common to the circular passageways 126 and 128 and which connects with the port corresponding to the fixture 48 (Figure 2).

Considering that the system is necessarily operated under a substantial pressure, reaching a maximum somewhat in excess of 700 pounds per square inch at high steering resistances, it should be apparent that a low pressure seal such as shown at 78 would not normally prevent leakage. This seal, however, is adequate to withstand the pressure of the fluid which accumulates from leakage past the bushing 76 between the seal and the spring loaded ball check valve 152 (Figure 5). Such valve is disposed in a passageway 150 which connects with the chamber 86—88 via a passageway 146 (Figure 7) extending radially from the space 148 representing the clearance between the head of the lock nut 101 and the inner wall of the recess in which the head of the nut is confined. Passageway 146 opens to annular conduit 72, which in turn connects with passageway 90. The valve 152 is necessary in order to prevent reversal of fluid flow in the identified passageways; i. e. entry of fluid into these passageways from the left-hand end of the cylinder. When sufficient pressure develops between the seal and valve the latter is unseated and the bleed fluid enters the cylinder and is thus re-used in the system without loss.

Reverting now to the recesses housing the springs 142 and 144, for the purpose of the invention, as applied to a gear comprising the particular type of valve disclosed, these recesses are employed as pressure chambers for hydraulic reaction to the end of supplementing the centering action of the springs. With the valve spool in centered relation, each of the chambers will be seen as open to the pump inlet and to the corresponding end of the power cylinder 18. Thus, the left-hand chamber 154 connects with the inlet port 130 via circular central passageway 124, a short passageway 158 in the spool 100, an annular passageway 160 provided by the clearance between the reduced portion of the stem 44 and the spool, and a passageway 161 formed in the shoulder 114. Such chamber connects with the left-hand end of the cylinder 18 through the last-mentioned passageway, the annular passageway 160, the short passageway 158 in the spool and passageways 138 and 140 (Figure 7). The right-hand chamber 156 connects with port 130 via circular central passageway 122, passageways 134 and 136 and a short branch passageway 162 shown as depending from passageway 136 in the section provided by Figure 5. The latter two passageways with the annular conduit 70 and the aperture 74 provide the connection between chamber 156 and the right hand end of the power cylinder.

When the valve spool is in its centered position as shown, the two chambers 154 and 156 are under substantially atmospheric pressure. However, on movement of the spool 100 in either direction, the chamber in the direction of movement becomes pressurized to the same extent as the end of the power cylinder with which the chamber communicates, while the flow of fluid to the opposite chamber is partially or completely blocked, depending upon the extent of the movement. Accordingly, the movement of the valve spool is opposed not only by the force of the spring compressed incident to the movement but also by a fluid force which is proportionate to the pressure required in the cylinder to turn the dirigible wheels in the desired direction and hence to the steering resistance. The "steering feel" so obtained is just one of several advantages of the system. Another major advantage resides in the fact that vibrations normally transmitted up the steering shaft to the steering wheel are substantially eliminated by the centering mechanism.

The opposing pressure which develops in the chamber 154 on the leftward movement of the valve spool is exerted against the end of the valve spool. Similarly, the opposing pressure which develops in the chamber 156 on the rightward movement of the spool is exerted against the end of the spool. It must be taken into account here that washers 108 and 106 have only a sliding fit about the stem 44 and the nut 102, respectively, and within the recesses in which they are confined.

In the particular embodiment of the invention illustrated, the annular shoulder 165 provided by the locking nut 101 is formed to the same area as the annular shoulder 166 representing the exposed portion of the head of the nut 102. Thus, in terms of fluid reaction, these shoulders cancel out. This leaves in the chamber 156 as surfaces for fluid reaction, the right hand end 170 of the spool 100 and the annular shoulder 172. Such shoulder 172 is formed to a slightly greater area than the annular step 174 to the left of the left hand end 176 of the spool. Accordingly, the negative effect of the shoulder 172 with reference to the resistance represented by the surface 170 on rightward movement of the spool is greater than the negative effect of the step 174 relative to the resistance represented by surface 176 on leftward movement of the spool. The purpose of this differential is to compensate for the reduction in the effective area of the right-hand face of the piston 22 caused by the shaft 24.

It will be understood that because the effective area of the right-hand face of the piston is less than that of the left hand face, a higher pressure must be developed in the right-hand end of the cylinder to bring about movement of the cylinder to the right, than must be developed in the left hand end of the cylinder to cause movement of the same to the left. Since the effective area for hydraulic reaction is made less in the right-hand reaction chamber 156, which it is to be remembered, is interconnected with the right-hand end of the cylinder, the force required at the steering wheel to move the spool 100 to the right, as necessary to confine the fluid flow to the right-hand end of the cylinder, is no greater than the force required for leftward movement of the spool, hence the undesirable condition mentioned in the forepart hereof is eliminated.

To describe now the general operation of the gear (Figure 3), let it be assumed that the operator of the vehicle wishes to negotiate a right turn and that the steering resistance is such that the valve spool tends to move relative to the valve housing despite the integrating effect of the forces previously discussed. In this case, on the clockwise rotation of the steering shaft 34 and the consequent forward movement of the rod 28, the valve spool will be displaced to the left (Figure 7) against the resistance of the spring 142 and the fluid pressure which instantaneously develops in the chamber 154. The flow of the fluid to the power cylinder now being substantially or completely confined to the forward end thereof served by the passageways 138, 140, the cylinder is caused to move forwardly to rotate the bell crank 10 clockwise on its pivot. This clockwise rotation of the bell crank of course swings both of the tie rods 12 to the left and the dirigible wheels to the right. On cessation of the steering effort at the steering wheel, the valve parts promptly assume their normal centered relation and the dirigible wheels are restored to straight ahead position by the geometry of the steering linkage.

When the operator rotates the steering shaft 34 to the left in order to negotiate a left turn, the action obviously will be the opposite of that just described, the cylinder in this instance being caused to move rearwardly by partial or complete confinement of the flow of the pressure fluid to the end of the cylinder from which the piston shaft 24 extends.

Should the steering resistance be abnormally high (as when one of the dirigible wheels is being turned against a high curb, for example) damage to any of the component parts of the system may be prevented by a suitably located relief valve. This is a conventional expedient well known in the art and the valve for that reason need not be illustrated in the drawings.

It should be readily apparent that a vehicle equipped as illustrated can be steered manually through the adapter 36 in the event of a breakdown in the hydraulic system. In manual steering, there will, of course, be a very slight lag in either direction owing to the lost motion represented by the space between the thrust washers 106 and 108 and the shoulders 112 and 110, respectively.

We claim:

In a hydraulic actuator comprising a power cylinder confining a double-acting piston having a shaft extending from one face thereof through the adjacent end wall of the cylinder, a valve housing formed to provide a chamber at either end thereof adapted to contain fluid under pressure, and a spool element within said housing axially movable to control fluid flow to the two ends of said cylinder, the ends of said spool element being of substantially the same area and providing fluid reaction surfaces within said chambers, stem means through which said spool element is actuated, said stem means carrying a pair of annular ribs at either end thereof accommodated within said chambers, the inner three of the four shoulders provided by each pair of said ribs being subject to the pressure of the fluid within the corresponding chamber, the outer two of said three shoulders being of areas such that they substantially neutralize each other in point of reaction to the fluid pressure in the chamber, the inner of said three shoulders acting in opposition to the corresponding end of said spool element and in the case of the chamber corresponding to the piston shaft end of said cylinder being formed to an area reducing the effective surface of the end of the spool element to a degree compensating for the piston shaft, whereby the fluid resistance to movement of said spool element is substantially the same in either direction.

References Cited in the file of this patent

UNITED STATES PATENTS

| | | |
|---|---|---|
| 2,307,910 | Baade | Jan. 12, 1943 |
| 2,345,531 | Ganahl | Mar. 28, 1944 |
| 2,380,705 | Proctor | July 31, 1945 |
| 2,526,709 | Tait | Oct. 24, 1950 |
| 2,596,242 | Hill | May 13, 1952 |
| 2,608,263 | Garrison | Aug. 26, 1952 |
| 2,627,847 | Clark | Feb. 10, 1953 |
| 2,681,045 | Klessig | June 15, 1954 |
| 2,702,529 | Doerfner | Feb. 22, 1955 |
| 2,757,748 | MacDuff | Aug. 7, 1956 |